United States Patent
Wellenbrock et al.

(10) Patent No.: US 7,350,964 B2
(45) Date of Patent: Apr. 1, 2008

(54) DEVICE FOR CIRCULATING GRAIN PRODUCTS

(76) Inventors: Lothar Wellenbrock, DE-19073, Wittenförden (DE); Norbert Brautferger, DE-19073, Wittenförden (DE)

( * ) Notice: Subject to any disclaimer, the term of this patent is extended or adjusted under 35 U.S.C. 154(b) by 0 days.

(21) Appl. No.: 10/547,487

(22) PCT Filed: Mar. 3, 2004

(86) PCT No.: PCT/DE2004/000387

§ 371 (c)(1),
(2), (4) Date: May 10, 2006

(87) PCT Pub. No.: WO2004/078331

PCT Pub. Date: Sep. 16, 2004

(65) Prior Publication Data

US 2006/0227655 A1    Oct. 12, 2006

(30) Foreign Application Priority Data

Mar. 4, 2003  (DE) ................................ 103 09 317
Nov. 7, 2003  (DE) ............................ 203 17 311 U
Dec. 23, 2003 (DE) ............................ 203 20 104 U

(51) Int. Cl.
*B01F 7/24* (2006.01)

(52) U.S. Cl. .................. 366/261; 366/147; 366/169.2

(58) Field of Classification Search .............. 366/261, 366/186, 241, 266, 287–288, 297–300, 318–324, 366/603, 345–346, 147, 169.2; 416/176–177
See application file for complete search history.

(56) References Cited

U.S. PATENT DOCUMENTS

| 3,198,493 | A |   | 8/1965  | Sukup |
|-----------|---|---|---------|-------|
| 3,272,480 | A |   | 9/1966  | Sukup |
| 3,563,399 | A | * | 2/1971  | Shivers ..................... 366/318 |
| 4,491,422 | A |   | 1/1985  | Salter et al. |
| 5,980,100 | A |   | 11/1999 | Haegeman |
| 2006/0227655 | A1 | * | 10/2006 | Wellenbrock et al. ...... 366/261 |

FOREIGN PATENT DOCUMENTS

JP        2002-159989    *  6/2002

* cited by examiner

*Primary Examiner*—Charles E. Cooley
(74) *Attorney, Agent, or Firm*—Norris McLaughlin & Marcus, PA

(57) ABSTRACT

A device for circulating a grain product includes feed screw for the grain product and a connected drive unit for driving the feed screw. The drive unit is non-rotatably connected with a support body with a lower support surface which is inclined relative to the axis of the feed screw. The support body includes a surface area capable of withstanding the transport capacity of the feed screw. The support body further includes at least one blocking plate immersed in the grain product, wherein the surface area of the blocking plate is sized to withstand the peripheral forces generated by the rotating feed screw.

12 Claims, 9 Drawing Sheets

DEVICE FOR CIRCULATING GRAIN PRODUCTS

This is an application filed under 35 USC 371 based on PCT/DE2004/000387.

BACKGROUND OF THE INVENTION

The invention relates to a device for circulating a grain product. Devices of this type are used in the grain processing industry, in particular for drying and/or storing a grain product.

The moisture content of freshly harvested grain does not permit storage without the risk of spoilage. The moist grain forms hotspots which increase in size and ruin the grain. In addition, insects settle at these locations and contribute to the damage of the grain product.

For this reason, freshly harvested grain must be adequately dried before being stored, which is typically done in drying silos. The freshly harvested grain is continuously or cyclically fed into the drying silo from the top, while dry, warm air is blown into the drying silo from below. The dry air removes a certain amount of water from the grain and is vented into the ambient air from the upper region of the drying silo. The drying process can be accelerated by continuously circulating and intermixing the grain product. It is known in the art to employ a circulating unit located and operating in the upper region of the drying silo. This circulating unit is provided with a several driven feed screws arranged side-by-side, which are immersed in the deposited grain product and circulate the grain product from the bottom to the top. The feed screws reach all areas of the deposited grain product due to the revolving motion of the circulating unit and the changing radial position of the individual feed screws.

After an adequate drying process, the grain product is moved for storage into corresponding round storage silos or into low-rise storage buildings, where the grain product must be continuously aerated and/or circulated. This process is intended to prevent a formation of hotspots.

For example, DE-OS 27 21 782A discloses a corresponding circulation-storage unit for grain products for use in a round storage silo. This circulation-storage unit for the grain product is located in the center of the storage silo, is fixedly connected with the storage silo, and includes essentially a conveyor cylinder and a driven feed screw. The stored grain product slides across a conical bottom into the region of the feed screw and is transported by the feed screw through the conveyor cylinder into the upper region of the storage silo, where it is once more deposited on the already deposited grain product. This produces a revolving feed motion.

The circulation-storage unit for grain products is implemented as a fixed component of the storage silo and is therefore provided only for this particular application. The unit cannot be used in low-rise storage buildings because of its restricted effective range, which severely limits in the application of the circulation-storage unit. The costs associated with designing and manufacturing the circulation-storage unit for grain products is also quite high because it requires a conveyor cylinder.

After drying, the grain product is typically transported to large storage buildings, where it is poured out to form a flat pile. The grain is typically circulated by turning it over manually, which requires a lot of manual labor and many workers. It is also known in the art to use heavy mixing machinery for circulating the grain, which is not always available and is in addition very expensive. DE 35 00 881 A1 discloses a drilling screw for turning and loosening grain in storage filling spaces, which essentially consists of a hand drill and a feed screw clamped in the hand drill. The feed screw has a length corresponding to the height of the poured grain. The drilling screw is supported by the bottom of the silo by a sphere disposed on the tip of the feed screw. The drilling screw can be used both in round storage silos and in low-rise storage buildings. However, the drilling screw is relatively ineffective in low-rise storage buildings. Significant manual forces have to be generated to overcome the resistance of the drilling screw rotating in the grain, to hold the drilling screw in its operating position during operation and to move it from place to place. The drilling screws can therefore be operated only for short periods of time, which essentially prevents their use in low-rise storage buildings.

U.S. Pat. No. 4,491,422 discloses a similar device for circulating a grain product from a lower to an upper storage region. The device has a similar design, but includes an additional braking plate which opposes the inertial and feed forces and thus prevents the device from being immersed in the grain product.

U.S. Pat. No. 5,980,100 describes a device for treatment of a fluid, such as mixing or aerating of waste water. This device includes a feed screw and a drive unit for the feed screw. The drive unit and the feed screw are coupled to one another by a coupling unit. This device is intended for swirling the waste water in the region of the feed screw and, in a particular embodiment, introduces air at atmospheric pressure through a pipe into the water.

It is therefore an object of the invention to develop a device of this type for circulating a grain product, which can be used over an unlimited period of time and which does not require a manual force for circulation.

BRIEF SUMMARY OR THE INVENTION

The object is solved by providing a device for circulating a grain product from a lower to an upper storage region, in which the feed screw has a length greater than the immersion depth of the blocking plate and the feed screw is sized so as to enable the grain product to be circulated from a lowermost to an uppermost storage region. Further, advantageous embodiments of the device include a support body being cup-shaped with a support surface of arbitrary shape and an open side facing away from the feed screw or facing towards the feed screw. The support body may also be provided with a filling space for the conveyed grain product and the filling space may include a lateral discharge region for depositing the conveyed grain product onto the grain pile, wherein the dimensions of the filling space and the dimensions of the discharge region are matched to one another, so that a pressure sufficient to move the drive is generated by the conveyed grain product and applied to the device inside the filling space. For regulating the drive velocity of the device, the filling space includes near its discharge region an adjusting device, which adjusts a cross-section of an opening of the discharge region in a range between "fully open" to "closed". The feed screw has a preferably adjustable inclination angle relative to the support body, so that the front end of the support body rises from the grain product pile when the feed screw is oriented vertically. The feed screw for the support body has a pitch which increases towards the drive unit. The support body includes coupling units capable of combining several devices to a formation which increases the operating range. The support body includes a temperature sensor for measuring the temperature of the conveyed grain product, with the temperature sensor being connected with adjustment devices for regulating the transport velocity of the device. The feed screw includes an axial guide channel and radial exit openings, which are connected with a facility supplying air or fluid.

Both embodiments of the novel device eliminate the aforementioned disadvantages of the conventional devices.

Advantageously, the device is supported by the grain product, which obviates the need for otherwise required connections or supports, when the stationery device is used in a drying silo or a storage silo. The stationery device can then be used regardless of the type of silo, which broadens its application. The stationary device supported by the grain product also does not require a permanent operator for holding and guiding the device.

The application is further enhanced by configuring the device as a mobile device, which can also be used for grain piles stretching over a large area, for example, piles in a low-rise storage facility for grain products. The mobile device is hereby driven by the backpressure from the transported grain product in a filling space. This eliminates the need for mechanical drive unit to advance the device. Advantageously, the filling space of the mobile device can be easily closed off, so that the mobile device can also be used in a stationary operation. This also expands the application for the device.

BRIEF DESCRIPTION OF THE DRAWINGS

Two particular embodiments of the invention will now be described with reference to the drawings, which show in.

DETAILED DESCRIPTION OF THE INVENTION

Figure 1:
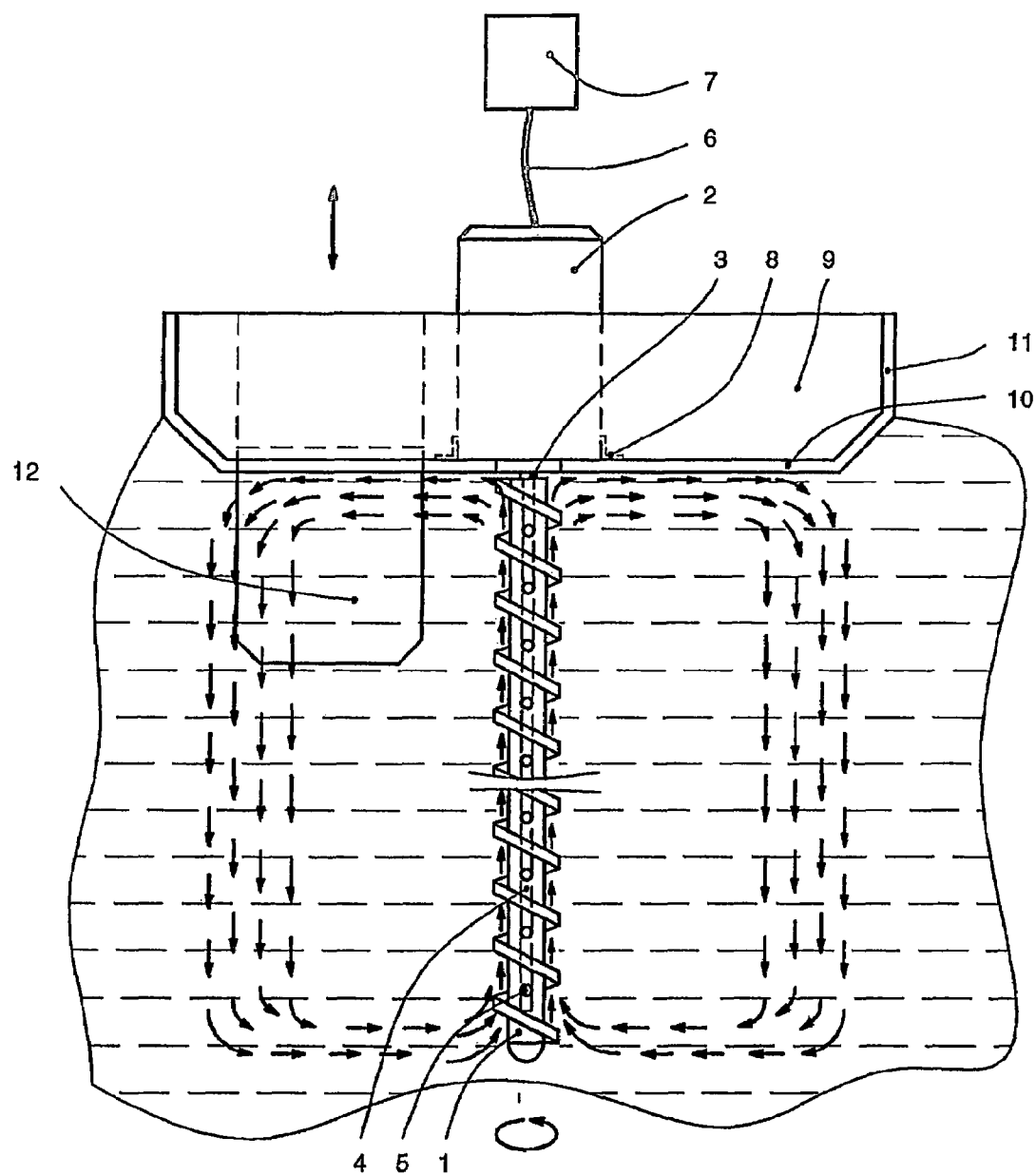
FIG. 1 a side view of a stationery device with a support body which is open at the top, FIG. 2 a top view of the device of FIG. 1, FIG. 3 a side view of the stationery device with a support body which is open at the bottom, FIG. 4 a side view of the stationery device with a closed, hollow support body, FIG. 5 a side view of the stationery device with a plate-shaped support body, FIG. 6 a side view of a mobile device, FIG. 7 a different side view of the mobile device, FIG. 8 a top view of the mobile device, and FIG. 9 a side view of the mobile device with a special feed screw.

The stationery device for circulating a grain product according to FIGS. 1 to 5 includes essentially a feed screw 1 and a drive unit 2 for the feed screw 1. The feed screw 1 and the drive unit 2 are releasably coupled with one another by a coupling unit 3, so that a feed screw 1 with a selected length can be used in accordance with the application. The feed screw 1 includes preferably an inner guide channel 4 with radial exit openings 5, which are connected by a supply hose 6 with a supply unit 7 for supplying air or a fluid. The drive unit 2 is preferably electrically operated and is rigidly connected with a support body 9 by mounting elements 8.

Figure 2:
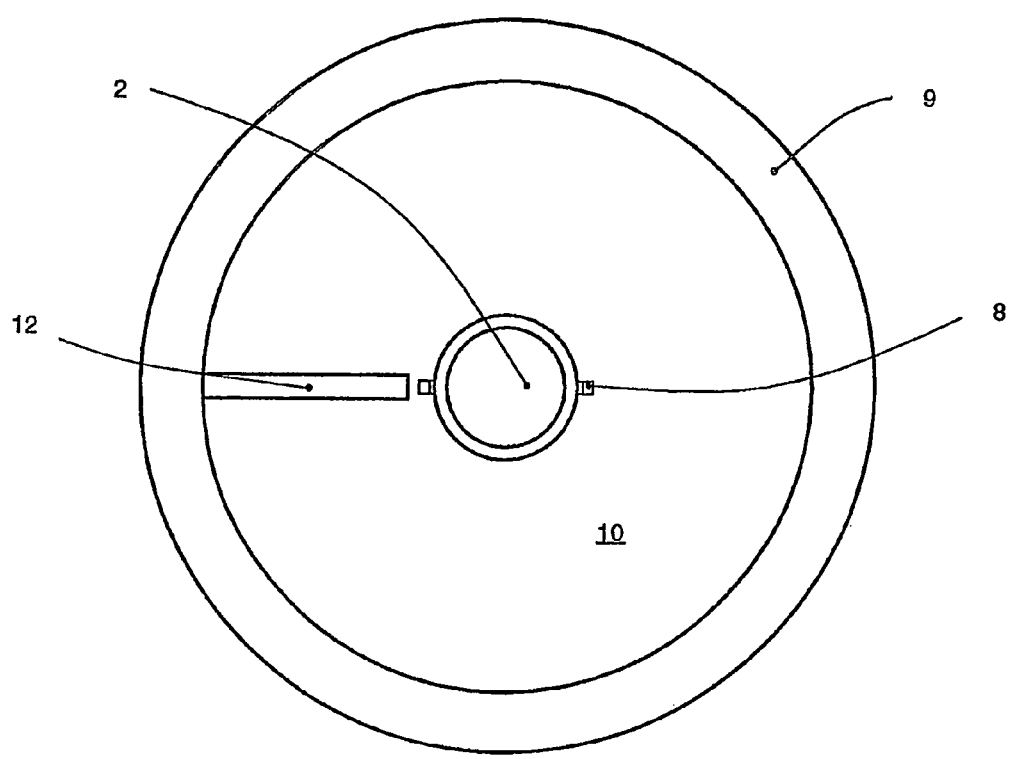

As illustrated in FIGS. 1 and 2, the support body 9 is cup-shaped and includes a bottom plate 10 and a circumferential wall 11. The bottom plate can be round, polygonal or have an aerodynamic shape. The cup-shaped support body 9 is open at the top. The bottom plate 10 is oriented perpendicular to the axis of the feed screw 1 and has a size matched to the feed capacity of the feed screw 1. The size of the bottom plate 10 is selected, so that a supporting force of the support body 9 maintains the device on the surface of the grain product. Because the open side of the cup-shaped support body faces up, the drive unit 2 is inserted in the support body 9 and secured to the bottom plate 10.

The bottom plate 10 also includes a blocking plate 12, which is arranged parallel to the axis of the feed screw 1 and oriented in the radial direction with respect to the axis of the feed screw 1. The area of blocking plate 12 is matched to the magnitude of the torque exerted by the feed screw 1. The blocking plate 12 is preferably height-adjustable and arranged in the bottom plate 10 so as to be lockable in different positions. In this way, the blocking plate 12 can be adjusted to match the application-specific magnitude of the torque at the feed screw 1.

Figure 3:
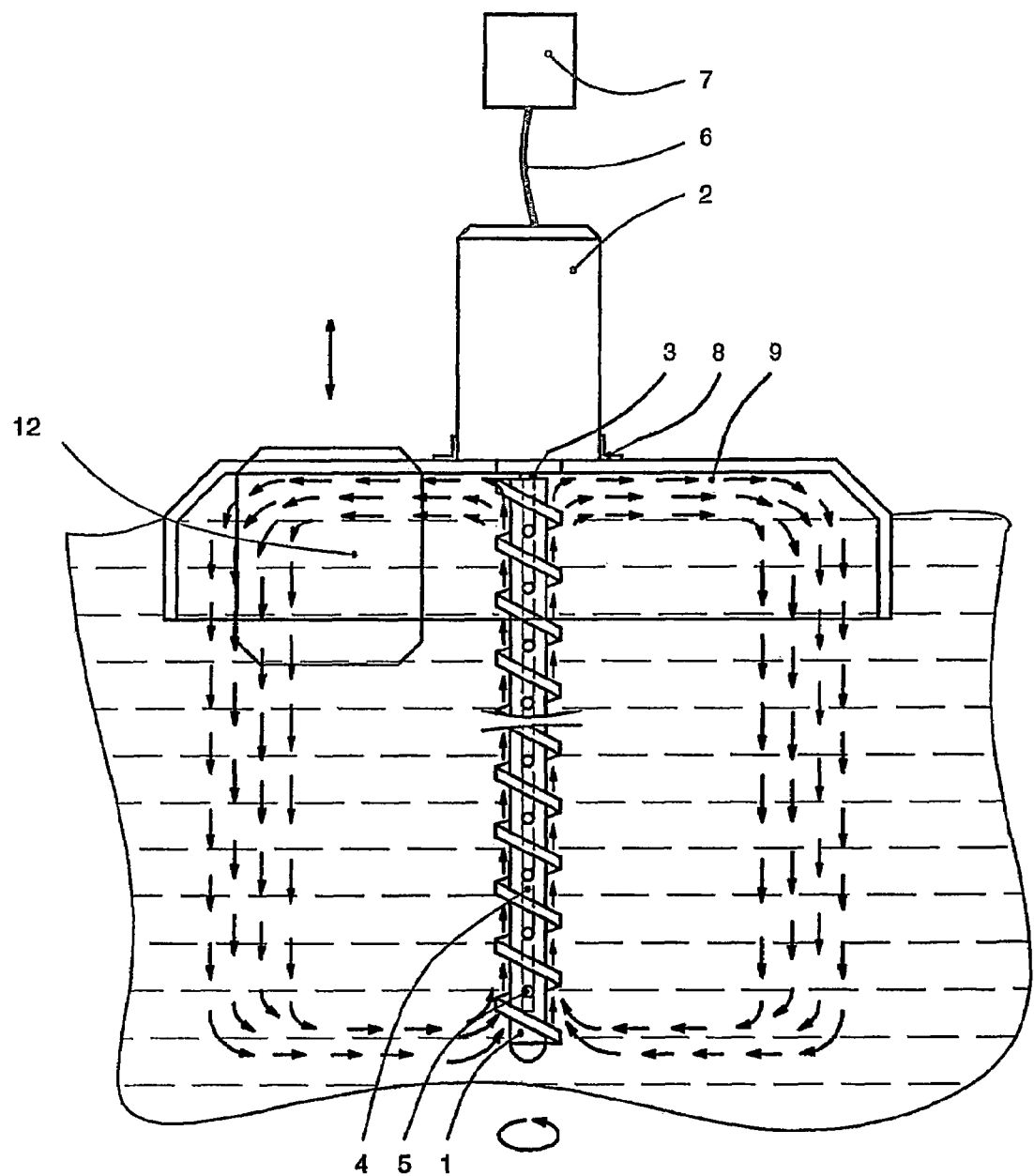

FIG. 3 shows an identical device with a likewise cup-shaped support body 9 which, however, is open towards the bottom. The blocking plate 12 is hereby also displaceable and lockable.

Figure 4:
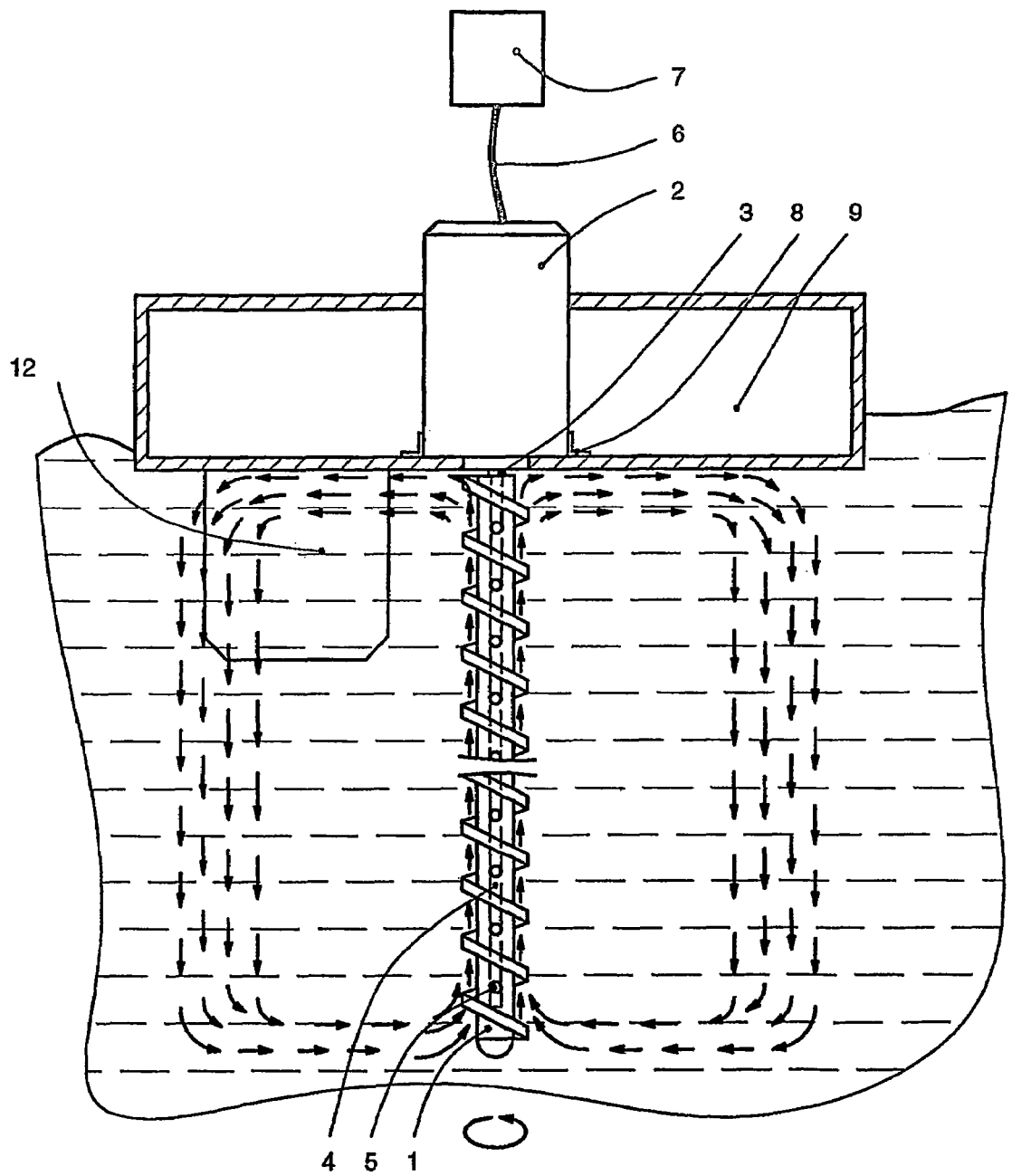

FIG. 4 shows the device for circulating a grain product, which also includes a feed screw 1, a drive unit 2 and a support body 9, whereby the support body 9 is implemented as a sealed, hollow body. The air trapped inside the hollow body creates additional buoyancy, so that the support body can have a smaller diameter. The blocking plate 12 is rigidly connected, preferably welded, to the bottom side of the hollow support body 9.

Figure 5:
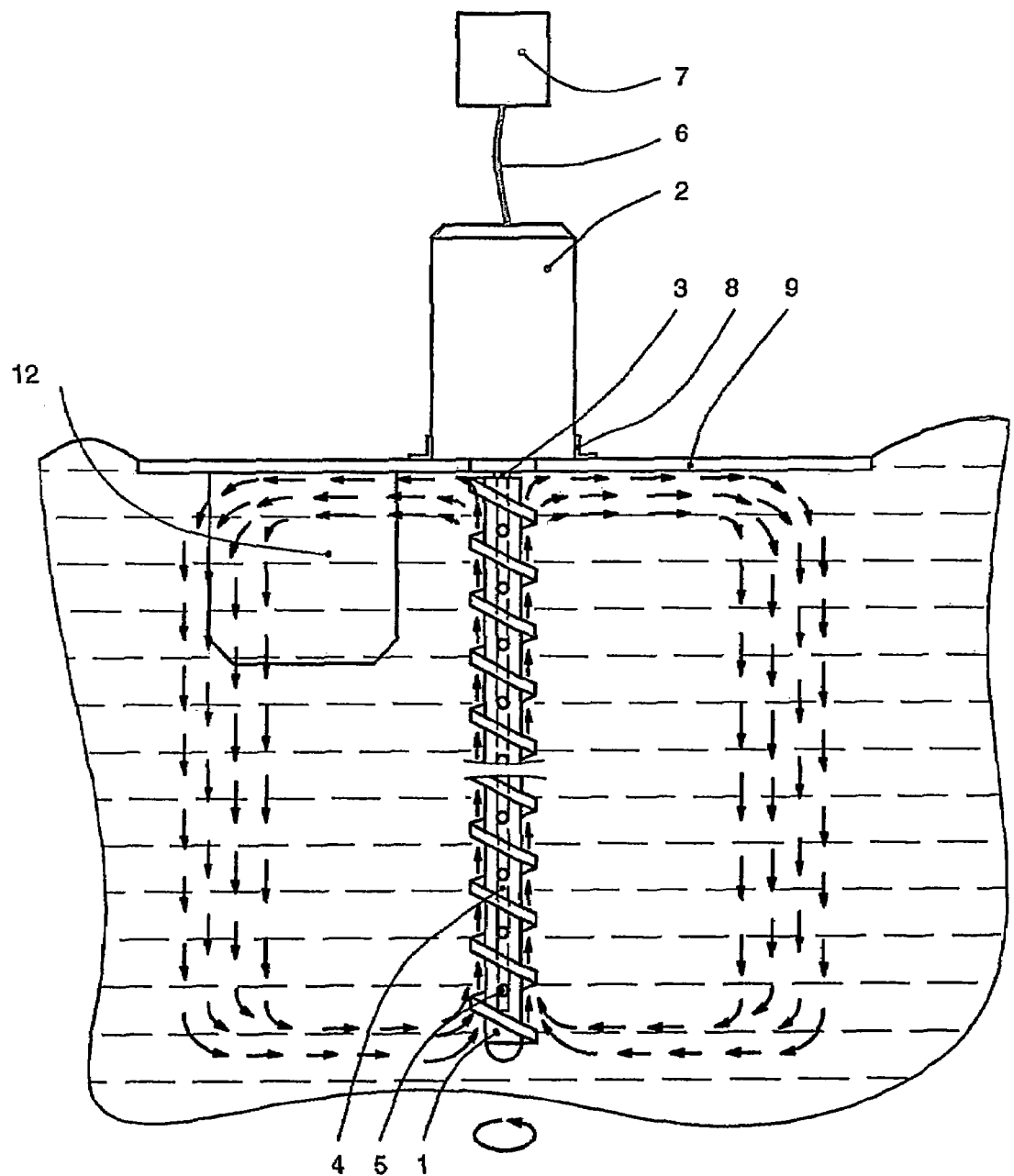

FIG. 5 shows a plate-shaped support body 9 of the device for circulating a grain product, with the blocking plate 12 again being welded to the bottom side.

The operation of the stationary embodiments of the device for circulating a grain product is relatively simple and can therefore be easily identified from the diagrams of FIGS. 1 to 5.

The feed screw 1 of the device is placed horizontally on the grain product, with the free end of the feed screw 1 contacting the grain product. The drive unit 2 is then switched on, so that the feed screw 1 digs into the grain product and attempts to orient itself in the vertical direction. The digging process ends when the entire surface area of the support body 9 rests on the grain product. The grain product is then transported by pushing the grain product located in the threads of the feed screw 1 upward and depositing it on the surface of the grain product. Only the lowest turns receive new grain, because the upper threads do not have any available space to receive additional grain. The grain at the lowest level is therefore always transported to the surface, while the intermediate layers settle into the lower, freed-up cavities. Removal of the grain from the bottom and depositing it at the top, and settling of the grain that is not transported creates a circulation within the deposited grain product, which moves warmer grain layers to the top and cooler grain layers to the bottom. Because the device is not subjected to radial forces, the device remains stationary during operation. The device also remains at its resting position, because the peripheral forces produced by the rotary motion of the feed screw 1 are absorbed by the blocking plate 12 immersed in the grain product. Stated in differently, only the feed screw 1 rotates, whereas in the device remains stationery.

The mobile device for circulating a grain product according to FIGS. 6 to 9 is particularly suited for a low-rise storage building and includes a bottom support plate 13 and a feed screw 1' which has already been described with reference to the first embodiment. The feed screw 1' extends through the center of the bottom support plate 13 and is oriented either perpendicular to the support plate 13 or is inclined with respect to the support plate 13, so that the front section of the support plate 13 rises when the feed screw 1' attempts to assume a vertical orientation. The inclination angle of the bottom support plate 13 can be adjustable.

The bottom support plate 13 has a circular surface with an open trapezoidal area segment. A filling space 14 is formed above the open area segment of the bottom support plate 13. The filling space 14 is prism-shaped, matching the open trapezoidal area segment of the bottom support plate 13. The filling space 14 is bounded by a front wall 15, two sidewalls 16, 16' and a cover-side support plate 17. The front wall 15 and the sidewalls 16, 16' are oriented perpendicular on the bottom support plate 13, while the cover-side support plate 17 is oriented parallel to the bottom support plate 13. The filling space 14 forms a discharge region 18 which faces the front wall 15, is covered by the cover-side support plate 17, and is bounded by the sidewalls 16, 16', and which opens into the horizontal direction. The sidewalls 16, 16' are constructed to rotate about a vertical rotation axis on the side that faces the discharge region 18 and faces away from the front wall 15. This divides the sidewalls 16, 16' into a stationary and a pivotable region 19, 19'. When the pivotable regions 19, 19' of the sidewalls 16, 16' are oriented towards each other, they open up a very small discharge region 18. Conversely, when the pivotable regions 19, 19' are oriented away from each other, they open up a discharge region 18 with a maximum opening. One or both pivotable regions 19, 19' can be designed so as to close off the filling space 14. This prevents the grain products from being discharged and the device from moving while the grain is circulated. An additional support plate 20, 20' is disposed horizontally and directly above the bottom support plate 13 and is secured on the pivotable regions 19, 19' of the sidewalls 16, 16'. The additional support plate 20, 20' is shaped and sized so as to close off the bottom of the filling space 14, as soon as the pivotable region 19, 19' of the sidewalls 16, 16' are rotated against each other, thereby reducing or closing the filling space 14 and the discharge region 18. Both the open area segment in the bottom support plate 13 and the cover-side support plate 17 are sized to match the maximum fill volume.

Those of skill in the art will recognize that the bottom support plate 13 and the cover-side support plate 17 can be designed according to the exemplary support body 9 of the stationery device, and that the filling space required for the drive can be integrated therein. One side of the bottom support plate 13 also includes a stand-up guide plate 21. The guide plate 21 is oriented parallel to the operating direction of the device. The size and orientation of the guide plate 21 are designed for support by a piled-up dam of the grain product. The size, shape and angle of the guide plate 21 are matched accordingly. Those of skill in the art may want to add one or more additional guide plates 21.

Two height-adjustable blocking plates 22, 22' extend through the bottom support plate 13. These are each mounted on the side outside the filling space 14 and are sized and shaped to prevent the device from rotating. The height of the blocking plates 22, 22' can be adjusted independent of each other by hand or automatically by a motor, based on certain parameters. A rear steering unit 23, which is immersed in the grain product and can pivot about a vertical rotation axis, is attached to the cover-side support plate 17 inside the filling space 14, separating the discharge region 18 in the center. The effective area of the rear steering unit 23 is matched to the steering characteristic of the device. A front steering unit 24, which is also immersed in the grain product and can also rotate about a vertical rotation axis, is secured below the bottom support plate 13 on the same line as the rear steering unit 23, facing the rear steering unit 23. The effective areas of the front steering unit 24 and the rear steering unit 23 are approximately identical. Both the front steering unit 24 and the rear steering unit 23 are used to steer the device in a desired direction and can be adjusted independent from each other, either manually or automatically with a motor, based on certain parameters. Using blocking plates 22, 22' and/or the rear steering unit 23 and/or the front steering unit 24 is optional.

The feed screw 1' is non-rotatably connected with the drive unit 2', whereby the drive unit 2' is attached to the cover-side support plate 17 by a seat 25. The drive unit 2' can be powered by electric energy or can be implemented as an internal combustion engine. The rotation speed on the driven side is approximately 250 to 750 $\text{min}^{-1}$.

The feed screw 1' is conventional and has a screw diameter of approximately 50 to 100 mm. The diameter and the pitch of the feed screw 1' as well as the rotation speed of the feed screw 1' can be matched to the quantity of the transported grain. The length of the feed screw 1' is also variable and is approximately between 1,000 and 4,000 mm long, with the lower end immersed in a grain pile.

Like the stationery device depicted in FIGS. 1 to 5, the feed screw 1' can be again be implemented as a hollow shaft which is connected with the supply unit 7 for supplying air or a fluid.

Figure 6:
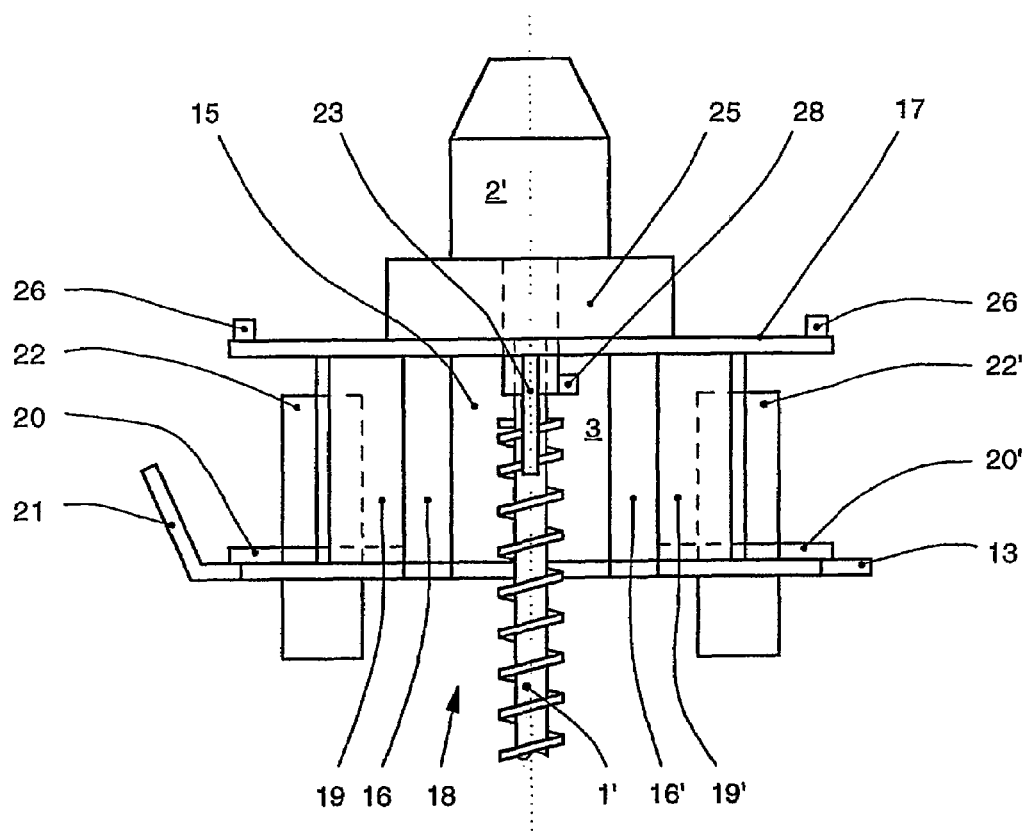
Figure 7:
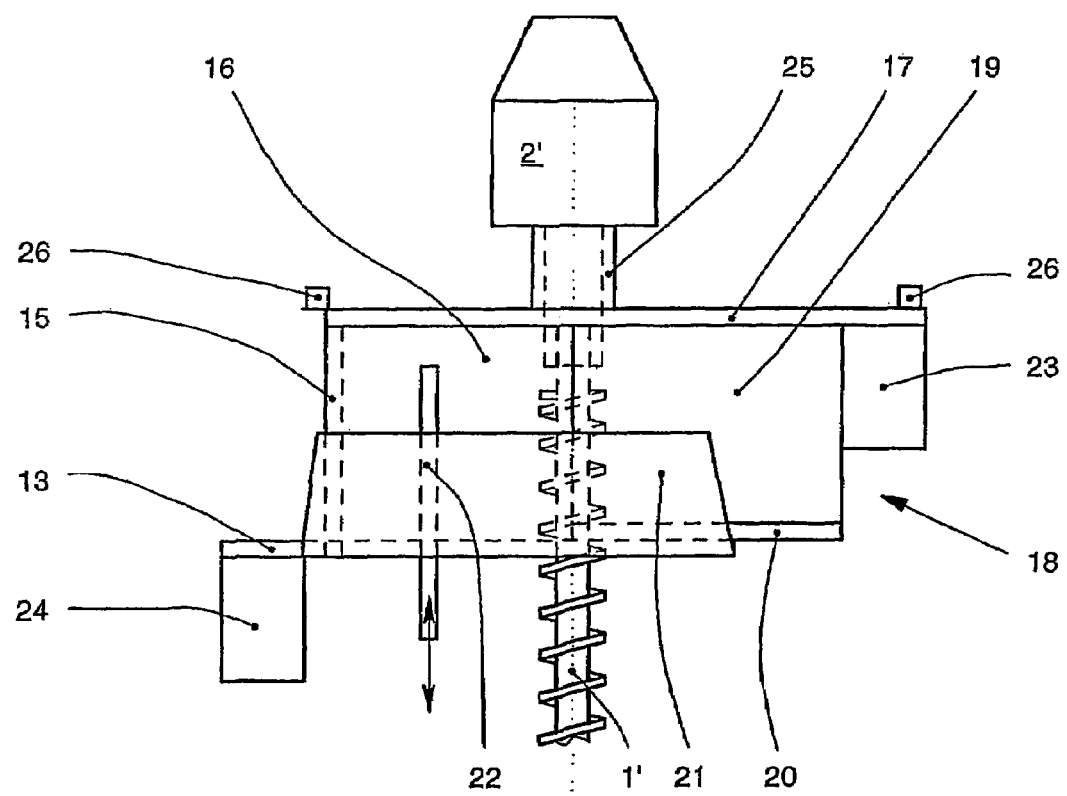
Figure 8:
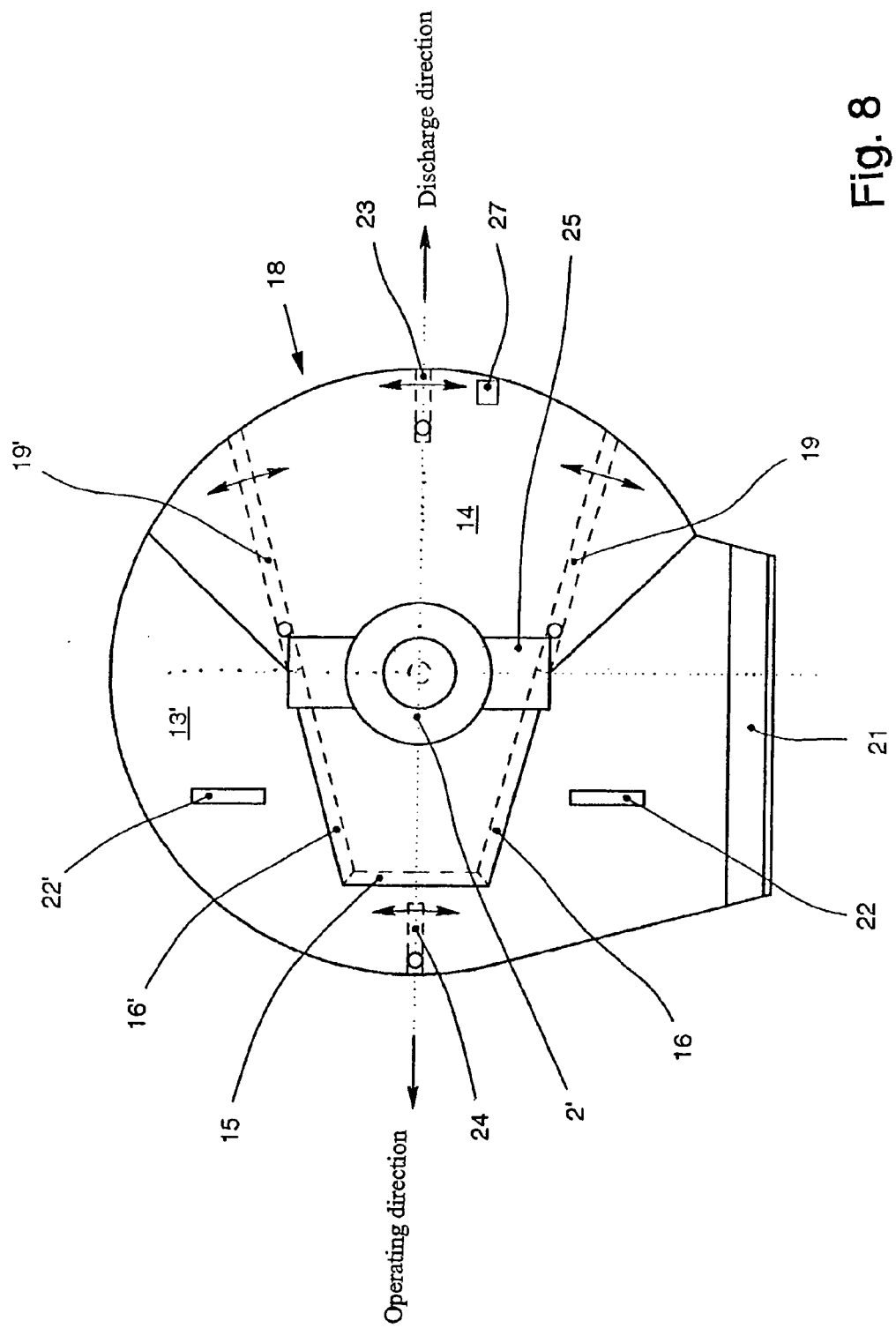

As shown in FIG. 6, the feed screw 1' can include an eccentrically secured weight in the region of the filling space 14, whereby the rotation speed of the feed screw 1' generates additional translatory impulses. A corresponding unbalanced mass 28 can be secured on the feed screw 1' so that of the translatory impulses operate perpendicular to both the front wall 15 and the discharge region 18.

Figure 9:
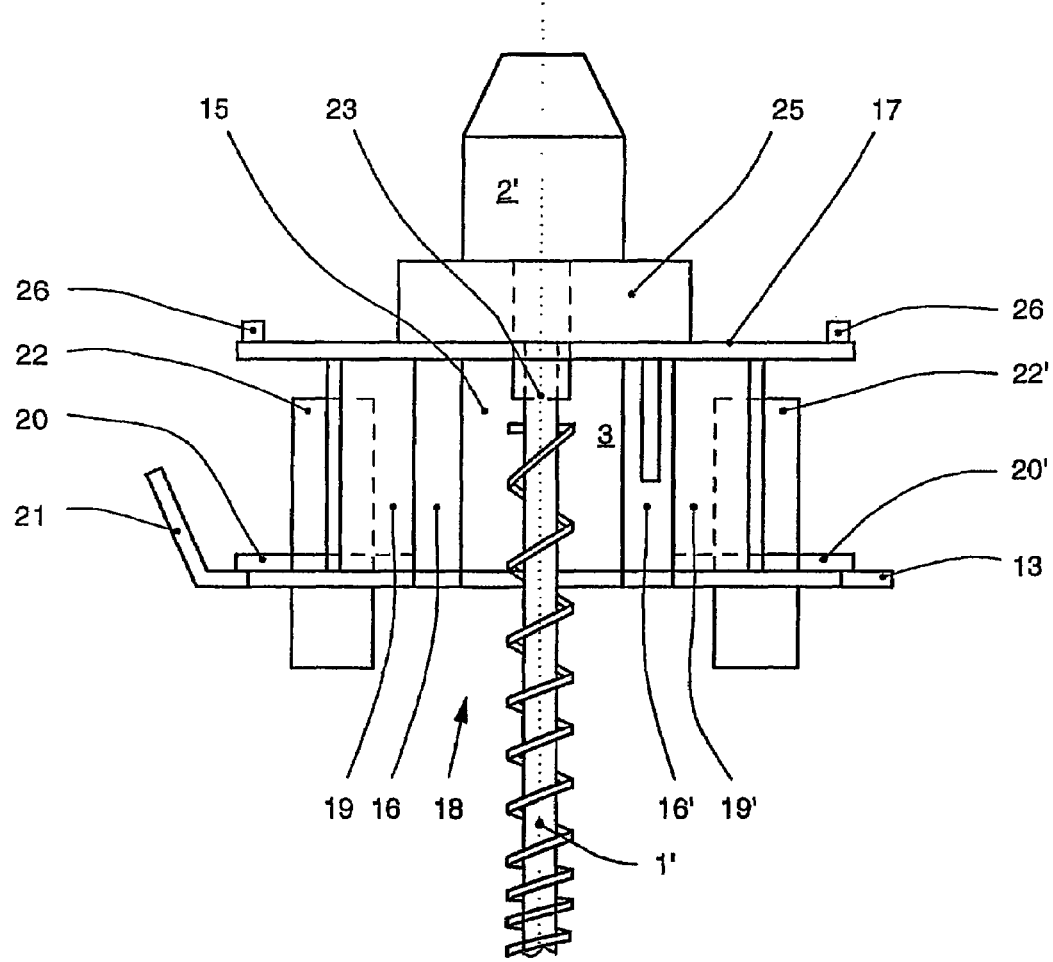

FIG. 9 shows a feed screw 1' with a pitch which increases steadily towards the drive side. As a result, the different transport spaces formed between the tooth profiles increase in size toward the drive unit 2'. The grain is then not only received from the lower regions, but from all the layers of the grain pile surrounding the feed screw 1'. Removing the grain product over the entire length of the feed screw 1' reduces the lateral resistance applied to the feed screw 1' by the grain product. This makes it easier for the feed screw 1' to move through the grain product. In the region of the cover-side support plate 17, the device is preferably provided with lateral, front and rear coupling units 26, which can be used to couple several mobile devices together via corresponding spacers. A formation of several devices can then be assembled for covering a larger area of the grain product. Such formation can consist, for example, of two or more rows of optionally interleaved devices arranged side-by-side. The formation can be steered in a different direction, so that the transport capacity of the feed screw 1' and hence the drive speed of one or several devices located on the outside can be switched off or reduced, so that the devices which are switched-off or throttled down become the rotation axis for the entire formation of the devices.

The rear area of the mobile devices can also include a temperature sensor 27 for measuring a temperature of the discharged grain product and determining the drive speed of the device using suitable control elements. If the transported grain product has a higher temperature, then the drive speed is reduced. Conversely, if the temperature of the transported grain product is lower, then the drive speed is increased. In this way, local hotspots can be treated more effectively.

In the following, a discontinuous operation of the mobile devices in a low-rise storage building for attempting to eliminate a hotspot will be described. The device is here moved across the surface of the grain product to a previously identified location of a hotspot which is located about 1 to 2 m below the surface. Advantageously, the device and the feed screw 1' can be transported separately which may be necessary due to their length. The upper end of the feed screw 1' is non-rotatably connected with the driven side of the drive unit 2' and placed flat onto the grain product. The drive unit 2' is then switched on, and the feed screw 1' automatically digs into the grain product, changing its orientation from horizontal to vertical. The feed screw 1' transports grain product into the filling space 14 commensurate with its rotation speed, its diameter, and its pitch. After the filling space 14 is filled to maximum capacity, a corresponding fill pressure is produced which is confined by the front wall 15 and the sidewalls 16, 16' and is released toward the discharge region 18. The additional feed pushes the grain product out of the discharge region 18. The flow of the grain product from the filling space 14 towards the discharge region 18 also produces a backpressure, which pushes on the front wall of the filling space 14 and moves the entire device in an operating direction. The device which is positioned on the grain product, then moves in the operating direction, pushing the grain product which had been moved out of the region of the hotspot out of the filling space 14 and placing it on the grain dam. The length of the feed screw 1' and the drive unit 2' cause pulsed vibrations in the device which advance the device in the operating direction. The movement direction of the device can not only be controlled by the steering units 23 and 24; instead, an operator may also push or rotate the device in one direction or another.

The mobile device can also be used in continuous operation in a low-rise storage building filled with a grain product for mixing the grain product during the drying process. An operator hereby orients the device in a first pass, so that the discharged grain product produces a straight dam in the center of the storage area. The device is then oriented so that its guide plate 21 contacts the built-up dam. In subsequent passes, the device is then supported on the accumulating grain dam by the guide plate 21, using the torque acting in the direction of the guide plate 21, and is thereby guided along the built-up dam. An operator reverses the direction of the device at the end of each pass. In this way, the entire area of the low-rise storage building can be treated.

The continuous operation of the mobile device can also be performed automatically. The device can be equipped with suitable transmitters, sensors and actuators and can be connected to a suitable data processing machine. The device periodically sends its actual spatial coordinates x and y, and optionally also z, to the data processing machine which processes the coordinates using a suitable program. The data processing machine in turn transmits to the device parameters for controlling, for example, the blocking plates 22, 22', the rear steering unit 23 and/or the front steering units 24. The automatic operation of the device according to the invention can be optimized by detecting a hotspot in the grain pile with suitable installed sensors, which transmit the x, y, and z coordinates of the hotspot to the data processing machine. The data processing machine then guides the devices across the low-rise storage facility to the hotspot. The sensors for measuring hotspots can be temperature sensors, density sensors, oxygen sensors or carbon dioxide sensors.

LIST OF REFERENCE SYMBOLS

1 feed screw
2 drive unit
3 coupling unit
4 guide channel
5 radial exit opening
6 supply hose
7 supply unit for supplying air or fluid
8 mounting element
9 support body
10 bottom plate
11 wall
12 blocking plate
13 bottom support plate
14 filling space
15 front wall
16 sidewall
17 cover-side support plate
18 discharge region of the filling space
19 rotatable region of the sidewall
20 additional support of the rotatable region of the sidewall
21 guide plate
22 blocking plate
23 rear steering unit
24 front steering unit
25 seat for the drive unit
26 coupling unit
27 temperature sensor
28 unbalanced mass

The invention claimed is:

1. A device for circulating a grain product from a lower to an upper storage region, comprising:
   a feed screw having a screw axis and configured for immersion in the grain product, and a drive unit driving the feed screw, both of which are connected via a coupling unit, wherein the drive unit is non-rotatably connected with a support body which has a lower support surface that is inclined relative to the axis of the feed screw, the support body having a surface area capable of supporting the device on the surface of the grain product during operation of the feed screw and including at least one blocking plate oriented parallel to the screw axis and extending in a radial direction with respect to the screw axis, said blocking plate immersed in the grain product, wherein the blocking plate has a surface area capable of withstanding the peripheral forces of the rotating feed screw, wherein the feed screw has a length greater than an immersion depth of the blocking plate, and wherein the feed screw is sized so as to enable the grain product to be circulated from a lowermost to an uppermost storage region.

2. The device according to claim 1, wherein the support body is cup-shaped with a support surface of arbitrary shape and has an open side facing away from the feed screw.

3. The device according to claim 1, wherein the support body is cup-shaped with a support surface of arbitrary shape and has an open side facing the feed screw.

4. The device according to claim 1, wherein the support body is provided with a filling space for conveyed grain product and the filling space includes a lateral discharge region for depositing the conveyed grain product onto a grain pile, wherein the dimensions of the filling space and the dimensions of the discharge region are matched to one another, so that a pressure sufficient to move the drive is generated inside the filling space by the conveyed grain product and applied to the device.

5. The device according to claim 4, wherein for regulating the drive velocity of the device, the filling space includes near its discharge region an adjusting device, which adjusts a cross-section of an opening of the discharge region in a range between "fully open" to "closed".

6. The device according to claim 4, wherein the feed screw has a preferably adjustable inclination angle relative to the support body, so that the front end of the support body rises from the grain product pile when the feed screw is oriented vertically.

7. The device according to claim 4, wherein the feed screw for the support body has a pitch which increases towards the drive unit.

8. The device according to claim 4, wherein the support body includes coupling units combining several devices to a formation which increases an operating range.

9. The device according to claim 4, wherein the support body includes a temperature sensor for measuring the temperature of the conveyed grain product, with the temperature sensor being connected with adjustment devices for regulating a velocity with which the device moves.

10. The device according to claim 1, wherein the feed screw includes an axial guide channel and radial exit openings, which are connected with a facility supplying air or fluid.

11. The device according to claim 1, wherein the blocking plate is height-adjustable in relation to the bottom plate of the support body.

12. The device according to claim 1, wherein the blocking plate is lockable in different height positions.

* * * * *

UNITED STATES PATENT AND TRADEMARK OFFICE
CERTIFICATE OF CORRECTION

| | |
|---|---|
| PATENT NO. | : 7,350,964 B2 |
| APPLICATION NO. | : 10/547487 |
| DATED | : April 1, 2008 |
| INVENTOR(S) | : Wellenbrock et al. |

It is certified that error appears in the above-identified patent and that said Letters Patent is hereby corrected as shown below:

Column 2, line 35, "BRIEF SUMMARY OR THE INVENTION" should read -- BRIEF SUMMARY OF THE INVENTION --.

Column 3, line 10, "stationery" should read -- stationary --.

Column 3, line 31, "stationery" should read -- stationary --.

Column 3, line 34, "stationery" should read -- stationary --.

Column 3, line 36, "stationery" should read -- stationary --.

Column 3, line 38, "stationery" should read -- stationary --.

Column 3, line 49, "stationery" should read -- stationary --.

Column 4, line 59, "stationery" should read -- stationary --.

Column 5, line 44, "stationery" should read -- stationary --.

Column 6, line 23, "stationery" should read -- stationary --.

Signed and Sealed this

Twenty-ninth Day of July, 2008

JON W. DUDAS
*Director of the United States Patent and Trademark Office*